L. BALESTRINO AND G. MERIGONE.
AUTOMOBILE LOCK.
APPLICATION FILED OCT. 14, 1919.
1,348,841.
Patented Aug. 10, 1920.
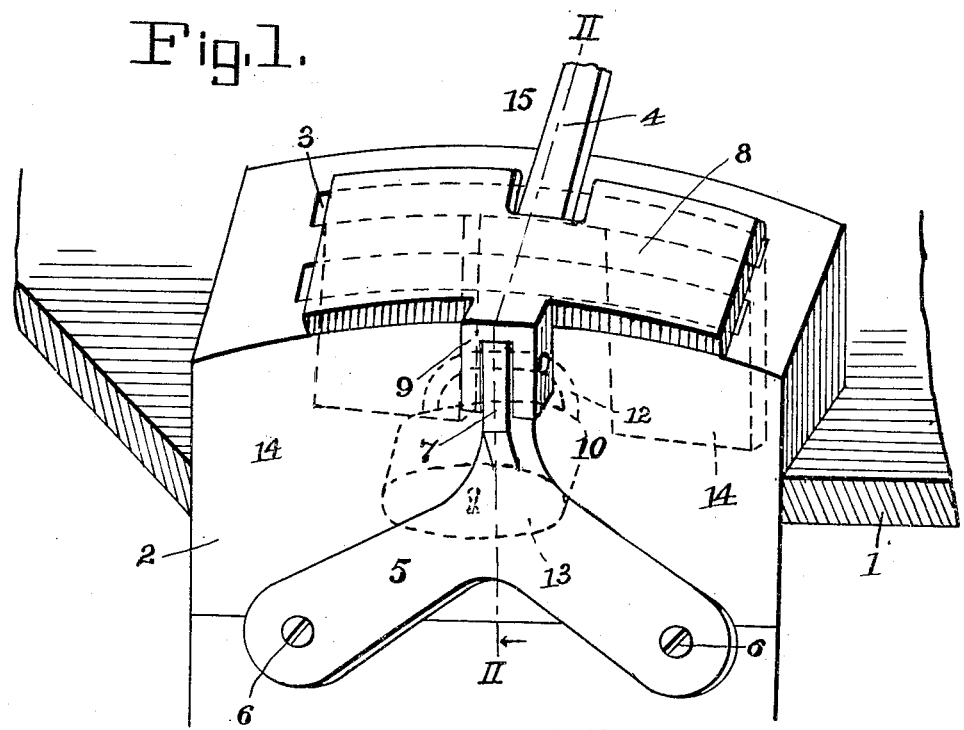
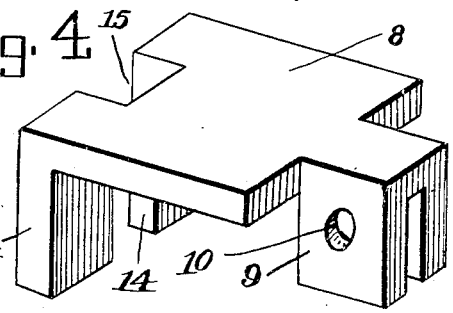
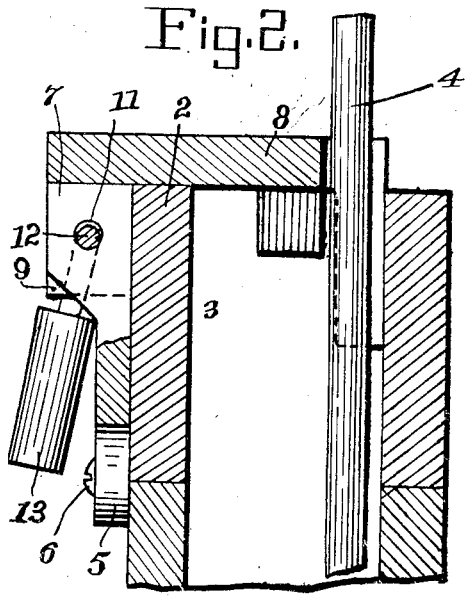
INVENTORS:
Louis Balestrino
and Giacinto Merigone,
By Frederick V. Winters, Attorney.

UNITED STATES PATENT OFFICE.

LOUIS BALESTRINO, OF BROOKLYN, AND GIACINTO MERIGONE, OF NEW YORK, N. Y.

AUTOMOBILE-LOCK.

1,348,841.

Specification of Letters Patent. Patented Aug. 10, 1920.

Application filed October 14, 1919. Serial No. 330,586.

*To all whom it may concern:*

Be it known that we, LOUIS BALESTRINO and GIACINTO MERIGONE, subjects of the King of Italy, and residents of Brooklyn, in the county of Kings and State of New York, and New York, in the county and State of New York, respectively, have invented certain new and useful Improvements in Automobile-Locks, of which the following is a full, clear, and exact specification.

This invention relates to means for locking the control levers of automobiles, and is especially designed for locking the gear shifting lever of the selective type used on the Hudson and other makes of automobiles.

The invention contemplates the provision of an attachment to be secured to the upper portion of the gear case or transmission case, and a separable part adapted to be inserted in one of the slots of said case in which the lever moves, for retaining said lever against movement such as is necessary to start the car, said separable part being locked in place by a padlock engaging the same and the attachment which is secured to the transmission case.

The object of the invention is to thus provide a simple form of locking device which may be attached to a Hudson or other make of car having a selective gear shifting lever of the type shown in the drawings, and need not be built into the car at the factory but can be afterward attached at small expense. Other objects will appear as the description proceeds.

The invention will be first hereinafter described in connection with the accompanying drawings, which constitute part of this specification, and then more specifically defined in the claims at the end of the description.

In the accompanying drawing, wherein similar reference characters are used to designate corresponding parts throughout the several views:—

Figure 1 is a perspective view of the upper portion of the transmission case of a Hudson car and a portion of the floor, showing our locking device attached to said case and arranged to hold the gear shifting lever in neutral position.

Fig. 2 is a section on the line II—II of Fig. 1.

Fig. 3 is a detailed view of the attachment which is secured to the transmission case, and Fig. 4 is a detailed view of the separable part which is locked to said attachment and engages the lever.

In the drawings, 2 designates the upper portion of the transmission case of a Hudson car, and 1 a portion of the floor through which it protrudes. The top of said case 2 has a slot 3 therein of the H-form type for guiding the gear selective lever 4, as is well known.

To lock said lever in neutral position so that the car cannot be started by an unauthorized person, two attachments are provided. One attachment is in the form of an inverted Y having its diverging arms secured to the side of the case 2 as by screws 6 so that its upwardly extending arm 7, which is perforated at 11, is arranged near the top of said case.

The other part of the locking device constitutes a cover 8 for the slot 3 and has extending spaced lugs 9 to embrace the lug 7, as shown in Fig. 1. Said lugs 9 are also perforated at 10 to register with the perforation in said lug 7, so that the shackle 12 of a padlock 13 may be passed through them for retaining the member 8 in locking position. The member 8 also has a notch 15 in its edge for embracing the lever 4 and holding it in neutral position when said member is locked to the lug 7. At opposite sides of the notch 15 there are downwardly turned lugs 14 on the member 8, said lugs being designed to extend down into the end portions of the slot 3 to aid in retaining the lever in neutral position and to prevent the edge of said member having the notch from being swung upward to disengage the notch from the lever when the other edge of the member is secured to the lug 7.

The attachment 5 may be easily attached to the transmission case of an automobile and may remain fixed thereto, while the member 8 may be taken off and carried in the tool box with the padlock when not in use.

Having thus described our invention, what we claim as new and desire to secure by Letters Patent of the United States is:—

1. The combination with the transmission case of an automobile having a slot therein, and a control lever movable in said slot, of a locking member having a notch to fit around said lever when in neutral position, lugs on said member to enter the slot at opposite sides of the lever, a laterally extending lug on said member projecting beyond the side of the transmission case, a bracket secured to the same side of said case, and means for locking the laterally extending lug on the locking member to said bracket for retaining it in locking position.

2. The combination with the transmission case of an automobile having a slot therein, and a control lever movable in said slot, of a locking member having a notch to fit around said lever when in neutral position, lugs on said member to enter the slot at opposite sides of the lever, a lateral projection on said member having a pair of spaced depending lugs arranged at the side of the transmission case, a bracket secured to the same side of said case and having a lug to fit between said depending lugs on the lateral projection of the locking member, and means for fastening said lugs together for the purpose specified.

In testimony whereof we have signed our names to this specification.

LOUIS BALESTRINO.
GIACINTO MERIGONE.